United States Patent
Medvinsky et al.

(10) Patent No.: US 12,556,411 B2
(45) Date of Patent: Feb. 17, 2026

(54) REVOCATION OF CERTIFICATES ISSUED BY DISTRIBUTED SERVERS

(71) Applicant: ARRIS Enterprises LLC, Suwanee, GA (US)

(72) Inventors: Alexander Medvinsky, San Diego, CA (US); Ting Yao, San Diego, CA (US); Tat Keung Chan, San Diego, CA (US); Jason Pasion, San Diego, CA (US); Jinsong Zheng, San Diego, CA (US); Xin Qiu, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 181 days.

(21) Appl. No.: 18/111,502

(22) Filed: Feb. 17, 2023

(65) Prior Publication Data
US 2023/0269099 A1    Aug. 24, 2023

Related U.S. Application Data

(60) Provisional application No. 63/311,662, filed on Feb. 18, 2022.

(51) Int. Cl.
*H04L 9/32* (2006.01)
*H04L 9/08* (2006.01)

(52) U.S. Cl.
CPC .......... *H04L 9/3268* (2013.01); *H04L 9/0825* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 10,958,433 B2 * | 3/2021 | Medvinsky | H04L 9/3268 |
| 2005/0076204 A1 * | 4/2005 | Thornton | H04L 9/3226 |
| | | | 713/156 |
| 2005/0257058 A1 * | 11/2005 | Yoshida | H04L 9/0891 |
| | | | 713/175 |

FOREIGN PATENT DOCUMENTS

WO    WO-2021105816 A1 *   6/2021   ......... H04L 63/0823

OTHER PUBLICATIONS

International Search Report and Written Opinion RE: Application No. PCT/US23/18871, dated Jul. 14, 2023.
Kai Lei et al: "A CA-based scheme of user authentication over Content-Centric Networking", Computer Science&Education (ICCSE), 2012 7th International Conference On, IEEE, Jul. 14, 2012, pp. 1053-1058, XP032232755, DOI: 10.1109/ICCSE.2012.6295245 ISBN: 978-1-4673-0241-8 abstract Chaper I. "Introduction" Chapter III. "Design and implementation".

* cited by examiner

*Primary Examiner* — Jeffrey C Pwu
*Assistant Examiner* — Mayasa A. Shaawat
(74) *Attorney, Agent, or Firm* — Chernoff, Vilhauer, McClung & Stenzel, LLP

(57) ABSTRACT

A method and apparatus for revoking and replacing digital certificates issued by distributed servers is disclosed. An architecture in which issued certificates from distributed factory and field provisioning servers are gathered into a centrally managed certificate authority which manages the full certificate lifecycle. Revocation and rekey approvals are performed through this central certificate authority, while the resulting revocation status and rekey approvals are made available for consumption by those same distributed servers.

18 Claims, 8 Drawing Sheets

REVOCATION OF CERTIFICATES ISSUED BY DISTRIBUTED SERVERS

The present application claims priority to U.S. Provisional App. No. 63/311,662 filed Feb. 18, 2022, the content of which is incorporated herein by reference in its entirety.

BACKGROUND

1. Field

The present invention relates to systems and methods for secure communication, and in particular to a system and method for managing digital certificates issued by an online digital certificate authority.

2. Description of the Related Art

A Certificate Authority (CA) is expected to comprise a very secure system. Device manufacturers and service providers depend on CAs to never lose control of secure parameters such as device private keys and the CA private key used to sign device certificates. At the same time, there are a multitude of threats and possible network-based attacks on any online system. Hence, it is normally preferred to keep a CA in a secure offline facility.

However, some certificate profiles and requirements may necessitate an online CA. For example, sometimes it is required to include device characteristics inside a certificate. Such characteristics may include device serial number(s) and identifier(s), device model, software version, hardware version, etc., and it is not always possible for a CA to know such information about a device in advance of the CA request. Instead, it is sometimes necessary for the information to be provided at the time of a certificate request, and online.

In another example, certificate lifetime may be very short, e.g., only a few months. Such short certificate lifetimes may be issued to devices which are not very secure and thus not trusted with the longer-lived certificates. In such cases, certificates that had been issued in batches ahead of being requested may sit on a key server for weeks or even months before they are requested and may be close to their expiration at the time they are needed. To avoid supplying devices certificates that are nearly expired, it is best to issue them online at the time that a certificate is being requested. Systems and methods that provide online access to digital certificates upon request and with minimal delay have been developed for this purpose.

One such system is described in U.S. Pat. No. 10,958,433, issued Mar. 23, 2021, to Medvinsky et al. entitled "ORIGIN CERTIFICATE BASED ONLINE CERTIFICATE ISSUANCE," which is hereby incorporated by reference herein. This discloses a highly secured offline CA that issues initial (origin) certificates and generates keypairs for clients, but in addition factory or field provisioning servers re-issue new certificates with the additional information they receive from a client device or factory. However, the full lifecycle, including revocation and issuing new digital certificates (e.g. rekeying) of such certificates is not described. Typically, revocation and rekeying services are implemented in a centralized managed Certificate Authority duplicating the same services on all the factory and field provisioning servers that can also issue certificates would be inefficient. What is needed is a centralized CA system that performs full lifecycle management of such digital certificates, including revocation and rekeying services.

SUMMARY

To address the requirements described above, this document discloses a system and method for managing a digital certificate stored by a client device. In one embodiment, the method comprises receiving a first digital certificate issued by a first certificate authority having a provisioning server; storing the received first digital certificate in a certificate database accessible to a second certificate authority; receiving, in the second certificate authority, a request to perform a revocation on the first digital certificate; retrieving the stored first digital certificate; receiving a first command from an administrator to approve the requested first digital certificate revocation; providing information regarding a revocation status of the first digital certificate for retrieval by the first certificate authority; receiving in the second certificate authority, a request to generate a replacement digital certificate having a same subject identity as the first digital certificate and a new public key; receiving a second command from the administrator to approve a generation of the requested replacement digital certificate; and providing information regarding a status of the requested first digital certificate replacement for retrieval by the first certificate authority.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
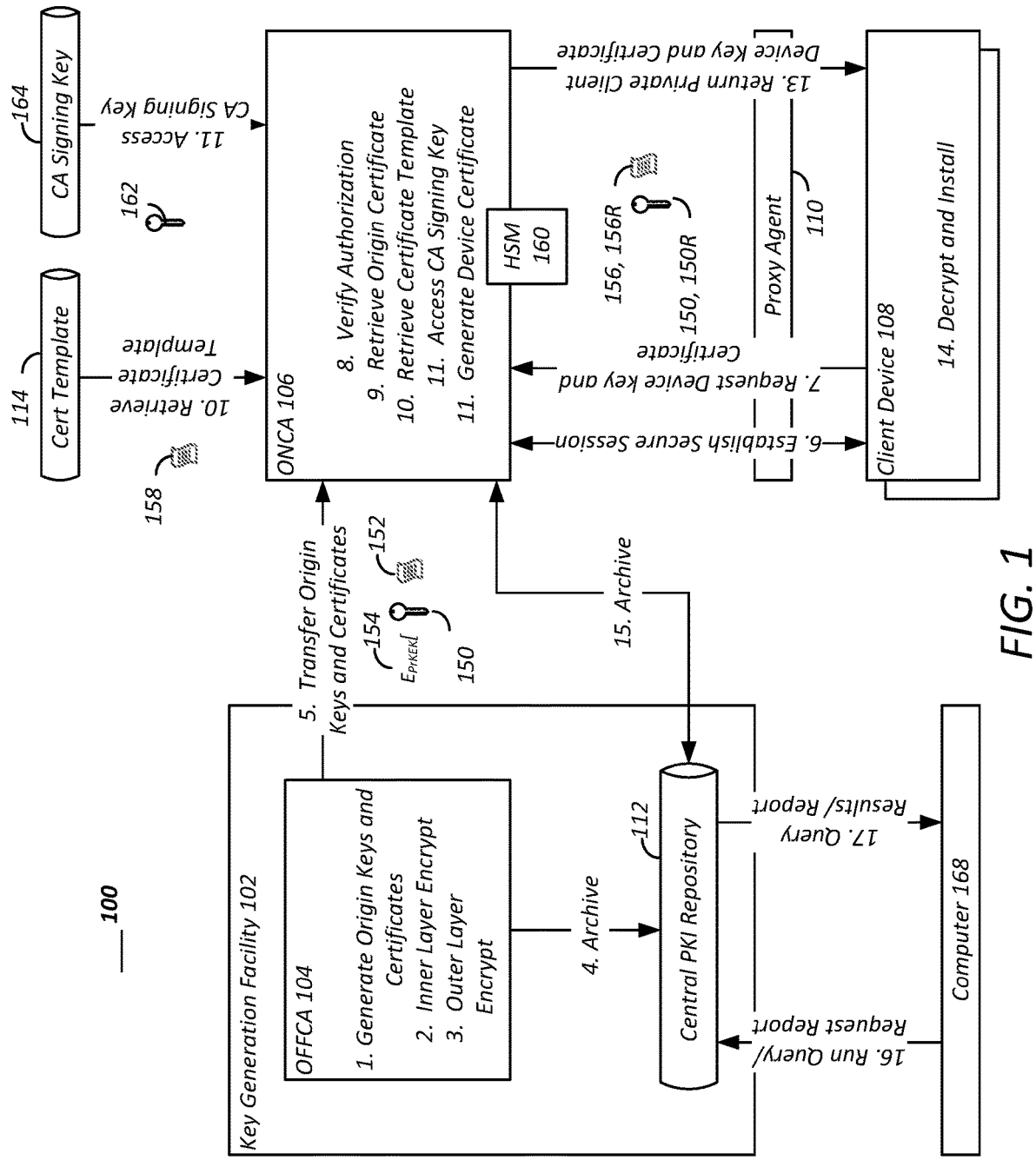
FIG. 1 is a diagram illustrating one embodiment of certificate issuing system.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Described below is a certificate management architecture where issued certificates from distributed factory and field provisioning servers are gathered into a centrally managed certificate authority which manages the full certificate lifecycle. Revocation and rekey approvals are performed through this central Certificate Authority, while the resulting revocation status and rekey approvals are made available for consumption by those same distributed servers.

Certificate Issuing System

The features disclosed below provide a system that utilizes an Offline Certificate Authority (OFFCA) to generate client public/private key pairs, encrypt the private keys and issue the corresponding digital certificates. This information is transferred to an intermediary certificate authority or online CA (ONCA) which does not possess the means to decrypt or modify the device private keys. However, the ONCA (at the time of receiving a certificate request) can extract the public key and other relevant information from an initial device certificate (origin certificate) and sign a new device certificate (Final Certificate) which includes information from the request. In this context, the signing of a data refers to a digital signature scheme in which a message or data is "signed" with a signature produced from the data and a private key of a private/public key pair generated by a key generation algorithm. The private key is typically selected uniformly at random from a large set of possible private keys. The message is then transmitted with the public key corresponding to the private key used to sign the message. The recipient of the message can then verify the authenticity of the message (that it came from the sender of the message) using the message, the included public key, and the signature.

This allows for flexibility offered only by an ONCA and can generate device certificates with device information which is only available at the time of a certificate request. And it improves security of the system by limiting the functions that the ONCA needs to perform. Since the ONCA is not able to generate, replace or access device private keys and is also limited to what information it can generate and add into device certificates, none of the device private keys will be exposed, even if the ONCA is compromised.

The ONCA obtains encrypted device private keys and origin certificates from the Offline CA and therefore cannot generate more device private keys and origin certificates than what has been already provided by the Offline CA. Once a security compromise of the ONCA becomes known, the ONCA no longer receives new encrypted device private keys and origin certificates, limiting how many individual Device Certificates would later need to be revoked and replaced.

As described further below, the system also includes a certificate aggregator, which collects certificates issued by the ONCA and saves them to a database accessible to a centralized certificate authority (CCA). An administrator approves revocations and rekey operations for issued certificates, and issues certificate revocation lists (CRLs), lists of certificates that are approved for rekey operations, and other certificate status, where such information can be retrieved by the ONCA and used for digital certificate management.

FIG. 1 is a diagram illustrating one embodiment of certificate issuing system (CIS) 100. The CIS 100 comprises a key generation facility 102 having the OFFCA 104 and the ONCA 106. In one embodiment, the operation of the CIS 100 is described as follows in accordance with the numbered operations shown in FIG. 1.

In the first process, the OFFCA 104 generates device private keys 150, the corresponding public keys, and the origin certificates (which contain the device public keys). The type of the device private key and device public key in the certificate may be Rivest-Shamir-Adleman (RSA), Elliptic Curve, ElGamal, digital signature algorithm (DSA) or any other type of public/private key pair.

In the second process, the OFFCA 104 encrypts the device private keys 150. In one embodiment, each device private key 150 is separately encrypted using a key that is not accessible to the ONCA 106. For example, the encryption key used to encrypt each of the private keys may be a Private Key Encryption Key (PrKEK) that is global, unique per client device 108 model or may even be a unique value that has been separately pre-provisioned into each target client device 108 or chip within the target client device 108.

Importantly, PrKEK is not available to the ONCA 106, and the ONCA 106 does not need to decrypt or make any further modifications to the device private keys 150 received from the OFFCA 104. In one embodiment, PrKEK is available only to the target client devices 108. In other embodiments having a proxy agent 110 (described further below interposed between the ONCA 106 and the target client devices 108), PrKEK may be available to the proxy agent 110, which provides an indirect network connection between the ONCA 106 and client devices 108. The proxy agent 110 is more fully discussed below.

In one embodiment, an optional second layer of encryption is imposed wherein the device private keys 150 are further encrypted (e.g. double encrypted) using an encryption key that is specific to a particular ONCA 106 instance or server. Hereinafter, that optional encryption key is referred to as an Outer Layer Encryption Key (OLEK). This further encryption of the device private keys 150 according to the OLEK is illustrated in FIG. 1 process three.

In operation four, the OFFCA 104 makes copies of the origin digital certificates and encrypted private keys and archives them in a data repository 112, for example, in the illustrated central public key infrastructure (PKI) repository 112. This archived information can be used to generate reports at a later time or for re-provisioning the device private key and origin certificates to client devices 108 that lose their private key and/or certificate, for example, because of corruption of a memory of the client device 108 itself. This permits the same device PKI to be re-provisioned into such devices.

Regulations or customer requirements may prohibit the saving of device private keys 150 in the data repository 112, or limit the period for which such device private keys 150 may be saved or archived (after which, they must be erased), even when the device private keys 150 are in encrypted form. In such embodiments, the device private keys 150 are not archived as described in operation four. However, even in such cases, the origin digital certificates 152 may be archived, as there are typically no prohibitions to saving or retaining the origin digital certificates 152. Computer 168 can be used to run queries and request reports.

In operation five, the pre-generated (in operation one) and encrypted 154 device private keys 150 and origin certificates 152 are transferred to the ONCA 106. These pre-generated encrypted private keys 150 and origin digital certificates 152 are later retrieved and use by the ONCA 106 in responding to certificate requests from the client devices 108.

Optionally, the interface used to transfer this information is authenticated, e.g., using TLS or secure sockets layer (SSL), to ensure that all PKI transferred to an ONCA 106 came from a legitimate source and to avoid denial of service attacks.

In operation six, the client device 108 and ONCA 106 establish a secure (encrypted and authenticated) session— for example using 2-way authenticated transport layer security (TLS) protocol. This operation is optional since it is possible to encrypt/authenticate each transaction separately (as described below), without using a separately pre-established secure session between the client device 108 and the ONCA 106. Also, a secure session may instead be established between the ONCA 106 and the proxy agent 110 referred to above. In that case, the process of establishing a secure session could occur earlier, any time prior to one of the client devices 108 submitting a request to the ONCA 106 for an identity (operation seven below) via the proxy agent 110.

In process seven, the client device 108 requests an identity that includes a client device private 150 key and a digital certificate 156. This request may include an identifier of the client device 108 (device ID) and/or serial number as well as client device 108 model information. This optional information may be included in the device digital certificate 156 that is generated by the ONCA 106 and returned to the client device 108.

The request for the identity may be authenticated (e.g. digitally signed) by the requesting client device 108 using a pre-existing private key and digital certificate that are already stored in the client device 108. This pre-existing private key and digital certificate may be unique in a variety of ways (e.g. unique among all devices from all sources, unique for a particular device class or model but common to all devices of that same class or model).

The request may be delivered directly to the ONCA 106 or it may be first delivered to the proxy agent 110. The proxy agent 110 may simply forward the request message as is to the ONCA 106.

Alternatively, the proxy agent 110 may verify the signature on the request message (if the message includes a signature) as well as check authorization of the requesting client device 108 for requesting certificates. If both checks pass, then the proxy agent 110 re-signs the same request with the signing key belonging to the proxy agent 110, and forwards the message to the ONCA 106.

In some embodiments, in addition to or instead of a secure session established during process six, this request message may include a Client Key Agreement Public Key (CKAPK). CKAPK may for example be a Diffie-Hellman (DH) or Elliptic Curve Diffie-Hellman (ECDH) public key and it will be utilized to protect the private key that is returned by ONCA 106 in a later step. CKAPK may be generated by either the client device 108 or by the proxy agent 110. CKAPK needs to be generated together with the corresponding Client Key Agreement Private Key CKAPrK, as they are paired keys.

In operation eight, ONCA 106, upon receiving the request, first validates the provided authorization by assuring that whichever entity signed the request (either proxy agent 110 or client device 108) is authorized to obtain the identity for the client device 108 (e.g. client device certificate 156 and device private key 150) which is being requested. If authorization fails, ONCA 106 returns an error code rather than a valid device private key 150 and device digital certificate 156.

In operation nine, ONCA 106 finds the next available (not yet assigned to a client device 108) origin certificate 152 and encrypted device private key 150 from its local repository (i.e., database). ONCA 106 later generates a new device digital certificate 156 that is derived from the origin certificate 152 while keeping the encrypted device private key 150 without any modifications.

In operation ten, after validating authorization, ONCA 106 finds a certificate template 158 that matches a specific client device 108 model for this request from a certificate template database 114. A certificate template 158 includes information such as certificate lifetime and various certificate attributes and extensions that are required to be present in the device digital certificate 156. The same set of origin certificates 152 that are issued by the same OFFCA 104 and have the same profile can be mapped to different certificate templates and different signing key based on a configuration of the ONCA 106. Or they can be paired with one specific certificate template.

Many of such attributes and extensions may already be present in origin certificates 152 generated by the OFFCA 104. However, some attributes such as a device ID, chip ID, device serial number, device software (SW) and hardware (HW) version may not have been known ahead of time to the OFFCA 104. In one embodiment, the certificate template 158 indicates which of those attributes need to be added to the origin certificate 152 to generate the device digital certificate 156 issued by ONCA 106 and where such attributes fit into the device digital certificate 156.

It is possible for multiple client device 108 models to share the same certificate template 158. The reverse is also true-it is possible for one client device 108 model to support multiple certificate templates 158. In the latter case, a request message sent in step seven would specify which certificate template 158 is being requested. Optionally, the ONCA 106 may determine which certificate template and which signing key should be applied to the new client device digital certificate 156 based on information in the request message coming from the client device 108.

Optionally, the certificate template 158 may contain a digital signature from the OFFCA 104 which needs to be verified by the ONCA 106 before the certificate template 158 can be used. This digital signature guards against unauthorized corruption of the certificate templates 158 in the ONCA's certificate template database 114.

Before generating a client device certificate 156, the ONCA 106 accesses a Certificate Authority signing key 162 that the ONCA 106 will use to sign the client device digital certificate 156. This CA signing key 162 is typically referenced by the certificate template 158. This CA signing key 162 may be stored in a hardware security module (HSM) 160 which is communicatively coupled to a computer or other hardware device of the ONCA 106. In that case, ONCA 106 obtains a handle to the CA Signing Key 162 inside the HSM 160, and the handle can be later used to sign a device digital certificate 156.

In other cases, the CA signing key 164 may be stored as an encrypted value which is referenced by the certificate template 158. In such an embodiment, the ONCA 106 sends the encrypted CA signing key 162 to the HSM 160, and the HSM 160 "unwraps" (e.g. decrypts) the CA signing key 162 inside the HSM 160. The ONCA 106 then utilizes the CA signing key 162 to sign the device digital certificate 156.

In operation twelve, the ONCA 106 builds a device digital certificate 156 containing the device public key and selected other attributes from the origin certificate 152 which was retrieved in step nine. The remaining attributes in the new device digital certificate 156 are determined based on the certificate template 158. Normally, that would include a validity period starting date based on the current date & time and a validity period ending date based on the device digital certificate 156 lifetime determined by the certificate template 158. Other data such as a client device 108 identifier or serial number as well as other client device 108 attributes specified by the certificate template 158 may be added to the device digital certificate 156 during this step. The ONCA 106 then signs the new device digital certificate 156 using the CA signing key 162 which is typically protected inside the HSM 160.

In operation thirteen, the ONCA 106 returns the just issued client device certificate 156 along with the corresponding encrypted device private key 150 (which are copied unchanged from the database or repository 112) to the requesting client device 108 in the response message. In addition to the optional protection provided by a secure session between the ONCA 106 and the requesting client device 108, the encrypted device private key 150 may be further encrypted with a KAEK (Key Agreement Encryption Key). The KAEK is derived from a key agreement protocol such as Diffie-Hellman (DH) or Elliptic Curve Diffie-Hellman (ECDH).

Optionally in this step, ONCA also returns the origin certificate 152 containing the same device public key as the just issued device digital certificate 156.

Figure 2:
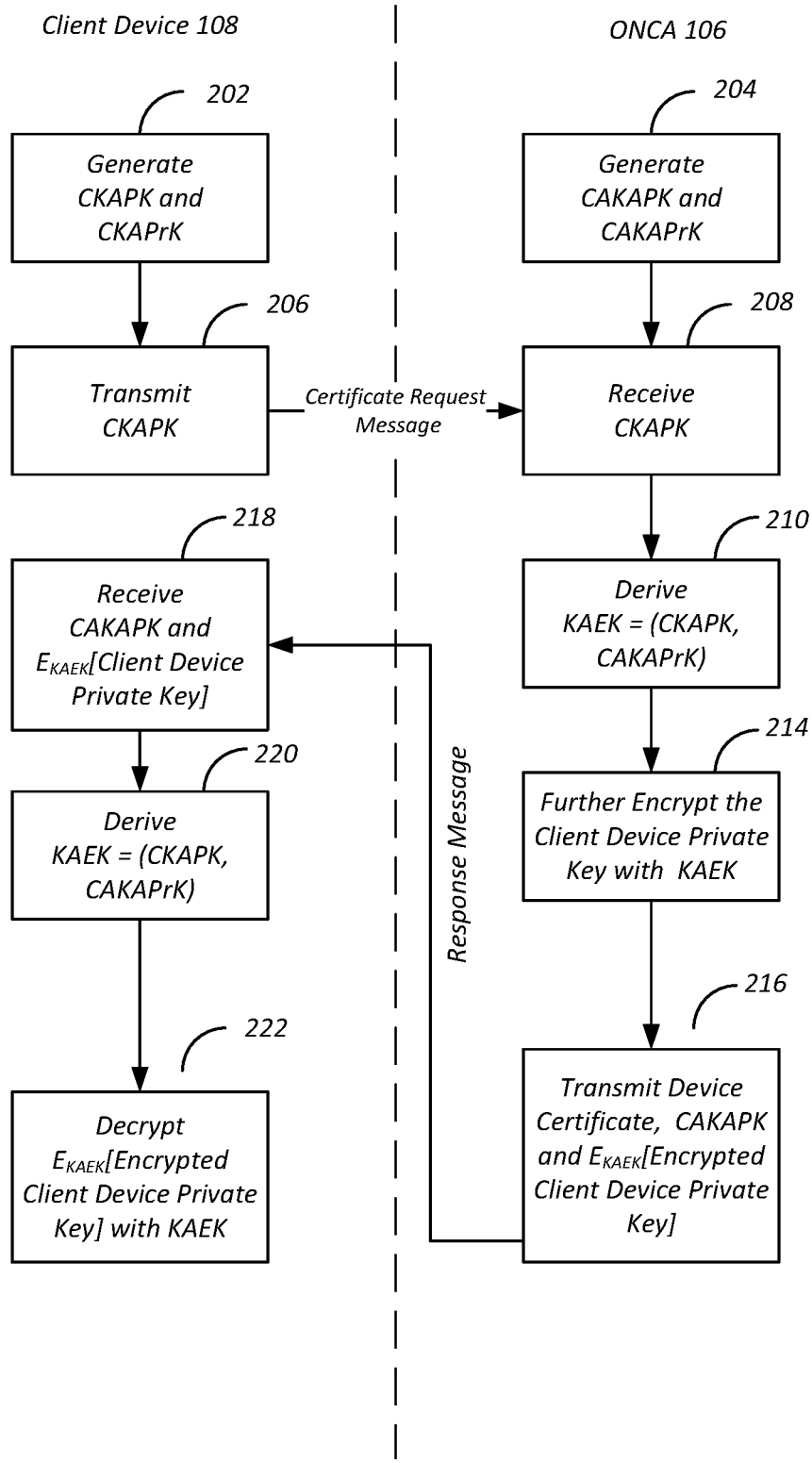
FIG. 2 is a diagram illustrating the derivation and use of a key agreement encryption key.

FIG. 2 is a diagram illustrating the derivation and use of the KAEK. The client device 108 generates a client key agreement public key (CKAPK) and a corresponding client key agreement private key (CKAPrK) as shown in block 202. Similarly, the ONCA 106 generates CA key agreement public key (CAKAPK) and corresponding CA key agreement private key (CAKAPrK), as shown in block 204. In block 206, the client device 108 transmits the CKAPK to the ONCA 106 as a part of the request message, as shown in block 206. The ONCA 106 receives the client key agreement public key CKAPK in block 208, and uses the received client key agreement public key CKAPK to derive the KAEK from the client key agreement public key CKAPK and the CA key agreement private key CAKAPrK. This can be accomplished using a variety of methods including:

Diffie-Hellman KAEK=Derive (CKAPK CAKAPIK mod p); and

Elliptic Curve DH KAEK=Derive (CAKAPrK*CKAPK) where '*' denotes a special elliptic curve multiply operation that is well-known to those skilled in cryptography, and p denotes a prime number. The ONCA 106 then derives the KAEK and further encrypts the encrypted client device private key with the KAEK to generate the further encrypted client device private key (EKAEK [Encrypted Client Device Private Key]), and transmits the client device certificate 156 and the further encrypted device private key to the client device 108 in the response message, as shown in blocks 210-216. In blocks 218 and 220, the client device 108 receives the response message, and uses the CA key agreement public key CAKAPK and the client key agreement private key CKAPrK to generate the key agreement encryption key KAEK. Then, in block 222, the client device 108 decrypts the further encrypted client device private key using the generated key agreement encryption key KAEK to produce the single-encrypted client device private key.

In operation fourteen, the client device 108 optionally verifies that a received device digital certificate 156 is valid and has a valid CA signature (using the CA signing key 162), then decrypts one or more layers of encryption from the device private key 150. For example, two layers of encryption may be inner-layer encryption with PrKEK (that was originally added by OFFCA 104) followed by outer-layer encryption with KAEK described in the previous operation. All such encryption layers are removed (the outer layer encryption with KAEK removed as shown in block 222 of FIG. 2), after which the client device 108 verifies that the fully decrypted device private key 150 corresponds to the device digital certificate 156 and the device private key contained therein.

Alternatively, the proxy agent 110 can perform the above verification and decryption steps and then can forward device digital certificate 156 and device private key 150 the target client device 108 over a separate connection.

Once the client device 108 possesses a fully verified device digital certificate 156 and fully decrypted and verified device private key 150, the device digital certificate 156 and device private key 150 are installed locally on the target client device 108. Additional protection (for example, protection local to the device) may be added such as encryption or hardware based protection by use of a secure memory or a secure CPU in the client device 108.

Alternatively, the inner-layer encryption with PrKEK that was originally added to the device private key 150 by OFFCA 104 may remain and the device private key 150 encrypted with PrKEK may be stored in that manner persistently in the target client device 108. In such an embodiment, the target client device 108 removes the encryption with PrKEK from the device private key 150 each time that it is utilized internally within the client device 108 to perform a crypto operation such as decryption or digital signature.

The origin certificate 152 may also be transmitted by the ONCA 106 to the client device 108 in the previous operation. In this case, the origin certificate 152 may be persistently saved in the client device 108 along with the device digital certificate 156 and the encrypted device private key 150. The origin certificate 152 may have a longer lifetime than the matching device digital certificate 156 derived from the origin certificate 152 and may be utilized in the future to request other or additional device digital certificates 156.

As shown in operation fifteen, device digital certificates 156 that had been generated by ONCA 106 can be optionally copied back to the central PKI repository 112 for archival and for subsequent queries and reports.

In operation sixteen, an authorized administrator using a key generation facility administrative processor (for example, an individual working for a network operator which had deployed the client devices 108 may want to run some queries or reports on the device certificates that had been installed on client devices 108 in their network. The queries may count numbers of client devices 108 of various models that had been provisioned with client device certificates 156, run reports for specific time periods, for specific factory locations (if certificate provisioning took place in a factory), etc.

In operation seventeen, a report may be optionally generated based on the contents of the central PKI repository 112 and returned back to the requesting administrator.

Management of Issued Certificates

Figure 3:
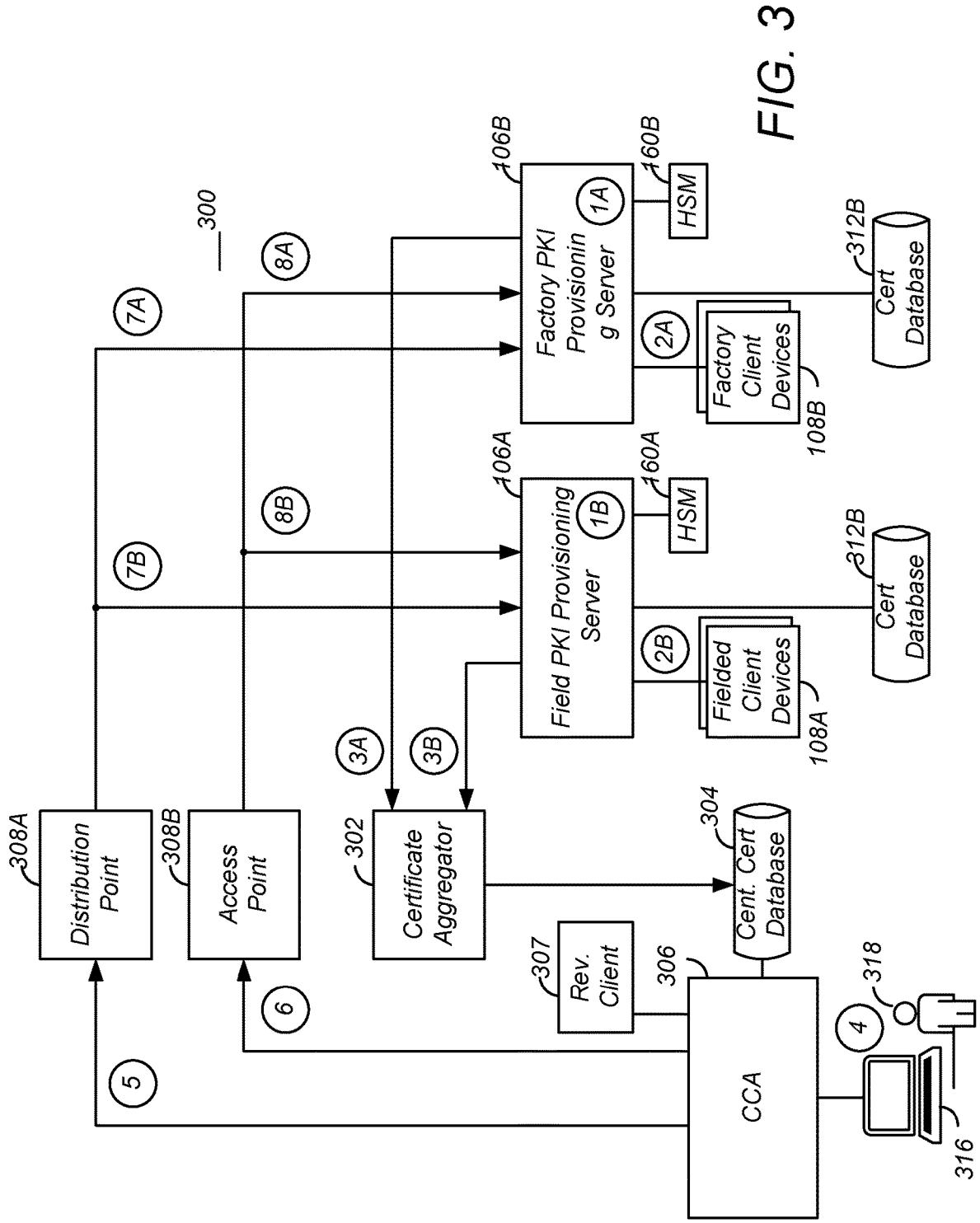
FIG. 3 is a diagram presenting an overview of an exemplary certificate management system.

FIG. 3 is a diagram presenting an overview of an exemplary certificate management system (CMS) 300. The CIS 100 disclosed in FIG. 1 illustrates the use of an OFFCA 104 to generate origin keys and origin certificates 152 and an ONCA 106 to generate and distribute device digital certificates 156 to client devices 108. In the discussion below, the OFFCA 104 and the ONCA 106 are together referred to as the first certificate authority, and the ONCA 106 is referred to as a provisioning server.

Also, the CMS 300 disclosed in FIG. 3 discloses the use of two provisioning servers. The first is a field provisioning server 106A used for fielded client devices 108A and the second is a factory provisioning server 106B used with client devices 108 that are being provided credentials in the factory. In the following discussion, provisioning servers 106A and 106B may be referred to as provisioning server(s)

106 in which case, either the field provisioning server 106A or the factory provisioning server 106B or both are referenced.

FIG. 3 will be discussed in conjunction with FIGS. 4, 5A, and 5B, which present diagrams illustrating the process in flow chart form.

In steps 1A and 1B, the field provisioning server 106A and factory provisioning server 106B issue certificates and in steps 2A and 2B, the field provisioning server 106A and the factory provisioning server 106B, respectively, deliver those issued certificates 156 and the corresponding private keys 150 to the fielded client devices 108A and the factory client devices 108B, as described above in FIGS. 1, 2, 3A, 3B, and the text appurtenant thereto. Typically, the issuance of such digital certificates 156 is in response to a request to generated and issue such digital certificates 156. Before such issuance, the field provisioning server 106A checks to determine if a digital certificate 156 has already been issued to the client device 108. If no digital certificate 156 has been issued, the provisioning server 106 issues a new digital certificate 156 with a new key pair as described above and in U.S. Pat. No. 10,958,433. The provisioning server 106 sends a first (new) digital certificate back to the requesting device 108.

Figure 4:
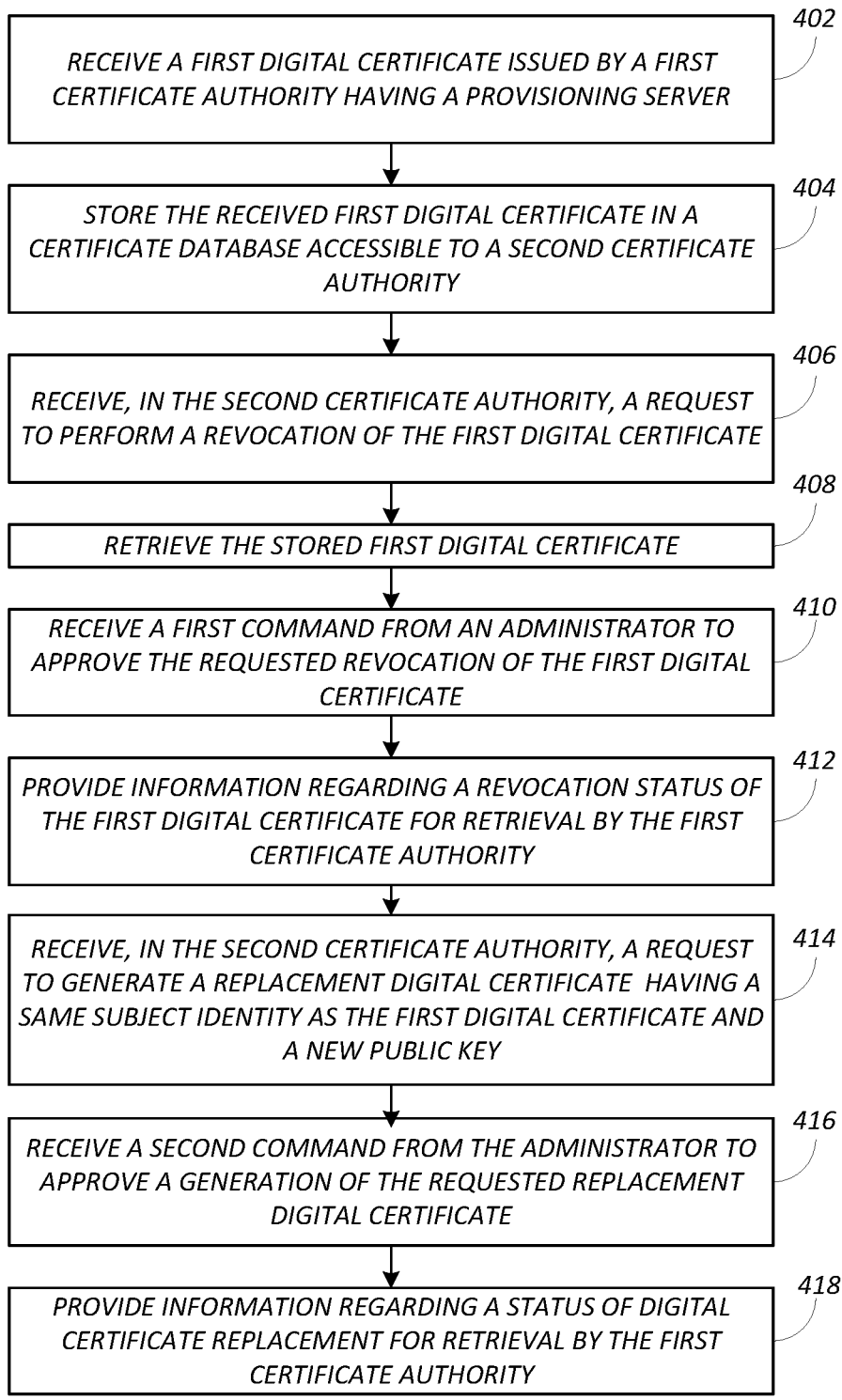
FIG. 4 is a diagram illustrating exemplary operations used to manage digital certificates.

In block 402 of FIG. 4 a first digital certificate 156 that was issued by the first certificate authority is received. This is also illustrated in FIG. 3, in which a certificate aggregator 302 gathers the issued certificates 156 from all of the provisioning server(s) 106A and 106B. In one embodiment, the certificate aggregator 302 is a process executing in conjunction with a certificate database 304 centrally managed by a centralized certificate authority (CCA) 306.

In block 404, the received digital certificates are stored in a database accessible to a second certificate authority. This is illustrated in FIG. 3 as the gathered issued certificates 156 being stored in a centralized certificate database 304, where they can be accessed by the CCA 306. The CCA 306 provides a user interface accessible by an administrator 318. Using the interface 316 implemented by a computer, the administrator 318 is able to approve managing actions such as revoking issued certificates 156 (certificate revocations) and reissuing replacement certificates 156R where appropriate. The administrator 318 is also able to query previously issued certificates 156 and select specific ones of those digital certificates 156 for revocation or replacement. Unlike typical CAs, the CCA 306 can perform these actions on digital certificates 156 that the CCA 306 did not issue, but rather issued by one of the field provisioning server 106A or the factory provisioning server 106B and collected by the certificate aggregator 302 and stored in the centralized certificate database 304.

This is possible because the CCA 306 is pre-provisioned with the same certificate signing keys 162 that are also provisioned to the field provisioning server 106A and factory provisioning server 106B (e.g. the signing key 162 provided to the ONCAs 106). Using these certificate signing keys 162, the CCA 306 is able to sign the certificate revocation list (CRL) or certificate rekey list (CRKL) using the same private key 162 that was used to issue the corresponding certificates. In other embodiments, the CCA 306 may be issued a CRL signing certificate, which enables it to sign CRLs, but not to issue or re-issue digital certificates 156.

In block 406, the second certificate authority (e.g. the CCA 306) receives a request to perform a revocation of the digital certificate 156. This request may be received, for example, out of band (e.g., via email or support portal) and then submitted by an administrator 318. Alternatively, revocation requests may be submitted to CCA 306 through an automated interface (e.g., using a standard interface such as CMPv2 or ACME) by a revocation client 307.

Typically, a digital certificate 156 is revoked because the private key 150 corresponding to the public key that is in the certificate 156 has been compromised (for example, the client device 108 that was using the digital certificate 156 and corresponding private key 150 has been hacked and the private key 150 may have been compromised). In such cases, it may not be safe to issue a new digital certificate 156 with the same client device 108 identity unless the security of that client device 108 has been improved and the means by which a previous attack gained access to the private key 150 is rendered ineffective.

To address this issue, the CCA 306 provides an administrative interface 316. The administrative interface 316 permits an administrator 318 to receive request to perform certificate revocations and requests for reissued (rekeyed) or replacement digital certificates 156R. Using the administrative interface 316, the administrator 318 can retrieve the stored digital certificates for examination, as shown in block 408, investigate whether issued digital certificates 156 should be revoked, and whether revoked digital certificates 156 should be rekeyed or replaced with a new replacement digital certificate 156R. If the administrator 318 determines that the subject digital certificate 156 should be revoked, a command is received in the CCA 306 from the administrator 318 to approve the requested digital certificate revocation, as shown in block 410.

Alternatively, revocation request in block 406 is received online from an authorized revocation client 307. The revocation client 307 may be operated by the same entity as the CCA 306 or it may belong to a network operator which is authorized to submit revocation requests only for certificates issued to that network operator.

In block 412, information regarding the revocation status of the subject digital certificate is provided to a notification entity 308 for retrieval by the first certificate authority. The notification entity 308 may comprise a distribution point 308A and/or an access point 308B. In one embodiment, this information comprises an identifier of the revoked digital certificate 156 that is provided with a list of identifiers of other revoked digital certificates 156. This list of the identities of digital certificates that have been revoked is known as a certificate revocation list (CRL).

Step 5 of FIG. 3 illustrates updated or new certificate revocation lists (CRLs) for each certificate issuer being provided to a distribution point 308A, which is typically an HTTP (hypertext transfer protocol) server. The provided CRLs can be retrieved from the distribution point 308A by interested entities. Such entities include any one of the field provisioning server 106A, the factory provisioning server 106B, and any third party entities that are authenticating the client devices 108 based on that device's digital certificate 156. The entity may then confirm that the initially provided digital certificate 156 has been revoked by confirming that the identifier of the first digital certificate 156 is included in the list of identifiers of revoked digital certificates.

In optional or alternative step 6, the CCA 306 provides the revocation information to another notification entity such 308 as an access point 308B such as an Online Certificate Status Protocol (OCSP) responder. The access point 308B answers to individual queries regarding whether a specific digital certificate 156 has been revoked or not. The answer of the access point 308B to the status inquiry for a digital certificate 156 can be based on the digital certificate's presence in the relevant CRL or the certificate's status in storage (such as certificate database 304) where the status of the digital certificates issued or hosted by CCA 306 is maintained. So, for example, the provisioning server 106 may transmit a query message to the access point 308B comprising the identifier of the previously issued digital certificate 156, and in response, the access point 308B provides an indication that the initially provisioned digital certificate 156 uniquely associated with that identifier has been revoked.

Thus, the field provisioning server 106A and the factory provisioning server 106B have the two different options for determining if a specific digital certificate is revoked-reading the CRL in the distribution point 308A as shown in steps 7A and 7B and checking to determine if the digital certificate is included in the CRL, or providing an identifier of the digital certificate at issue in a query to the access point 308B and examining the answer to that query, as shown in steps 8A and 8B. If the digital certificate is part of a certificate chain, a check for the revocation status of every digital certificate in the chain (except the root certificate) should be performed, including any sub-CA certificates.

In a typical embodiment, the information regarding the revocation status (e.g. the CRL or the query response) is signed by the CCA 306 and/or Access Point 308B using a same signing key used by the first certificate authority (e.g. signing key 162) or with a delegated signing key. However, the first certificate authority may delegate the provisioning of the information regarding the revocation status of the digital certificate to the CCA 306 and/or Access Point 308B by issuing CCA 306 and/or Access Point 308B its own certificate, in which case, the information regarding the revocation status is signed by the CCA 306 and/or Access Point 308B using a different signing key than that which the first certificate authority used to sign the initially provided digital certificate. In this case, the initially provided digital certificate may include a field identifying the CCA 306 and/or Access Point 308B as being delegated to provide the information regarding the revocation status. The signing certificate issued to CCA 306 is used to authenticate a CRL in this instance, while the signing certificate issued to Access Point 308B is utilized to authenticate each certificate status response sent by the Access Point 308B.

In block 414, the CCA 306 receives a request to authorize generation of a replacement digital certificate 156R having the same subject identity and a new public key. This request may be from, for example, a provisioning server 106, or from another approved entity. In another embodiment, CCA receives a batch request of a list of previously revoked digital certificates 156 for which replacement certificates are authorized. Using the interface of the CCA 306, this request is presented to the administrator 318 who can review the request, investigate whether the request should be granted. In the case of a batch request, an administrator 318 may selectively approve replacement for some of the listed digital certificates and not others. Should the administrator 318 approve the generation of the replacement digital certificate 156R, the CCA 306 receives a command from the administrator 318 approving the generation of the replacement digital certificate 156R and to generate the replacement digital certificate 156R, as shown in block 416. In block 418, information regarding the status of the replacement digital certificate 156R is provided for retrieval by the provisioning server 106. The provisioning sever 106 later checks for this information to determine if a replacement digital certificate 156R is authorized.

In one embodiment, the information regarding the status of the replacement digital certificate 156R comprises a list of digital certificates 156 that are approved to be replaced (e.g. a certificate replacement list or CRpL) is also provided to the distribution point 308A, to be made available to the same interested parties-typically via an HTTP get command. The CRpL may comprise the identities (subject names) of the digital certificates 156 to be replaced or the actual revoked digital certificates 156 for which a replacement is authorized. This list may include a digital signature of the CCA 306, along with any data necessary for signature verification, so that its origin and authenticity of the replacement digital certificate(s) 156R can be validated.

Figure 5A:
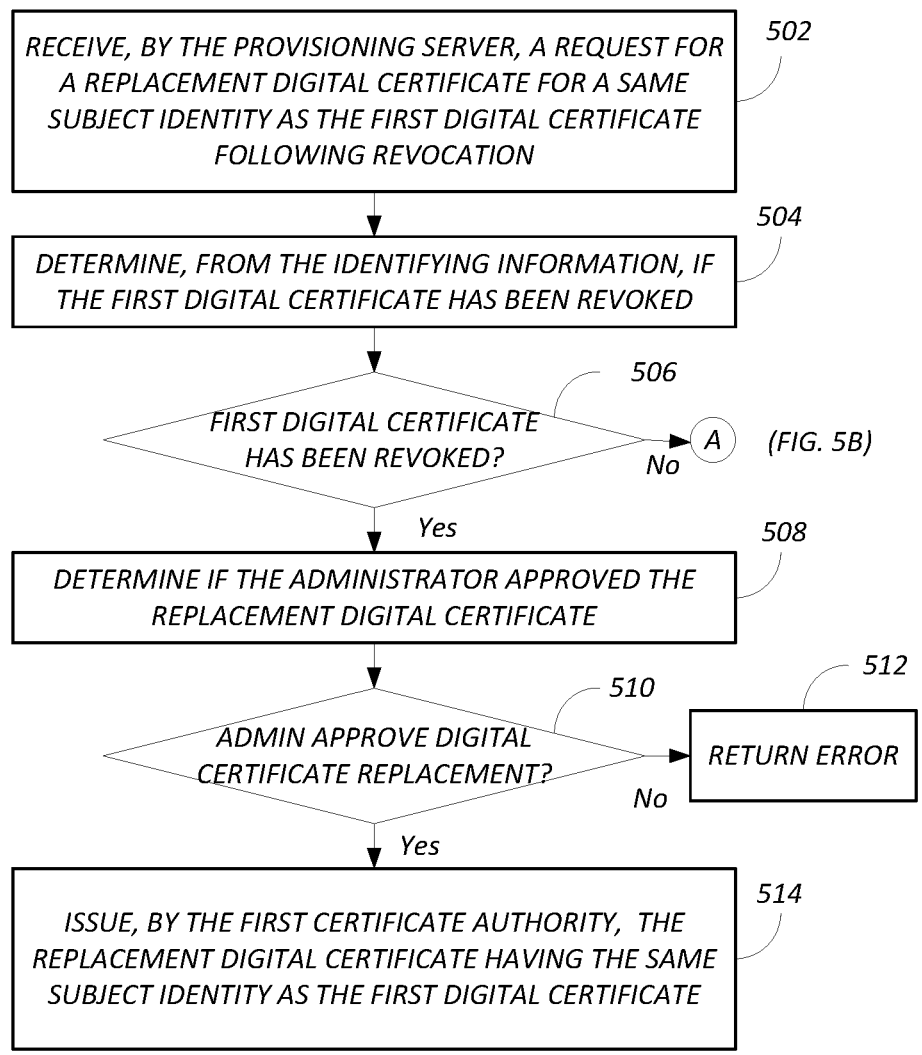
FIGS. 5A and 5B are diagrams illustrating exemplary operations used to replace digital certificates.
Figure 5B:
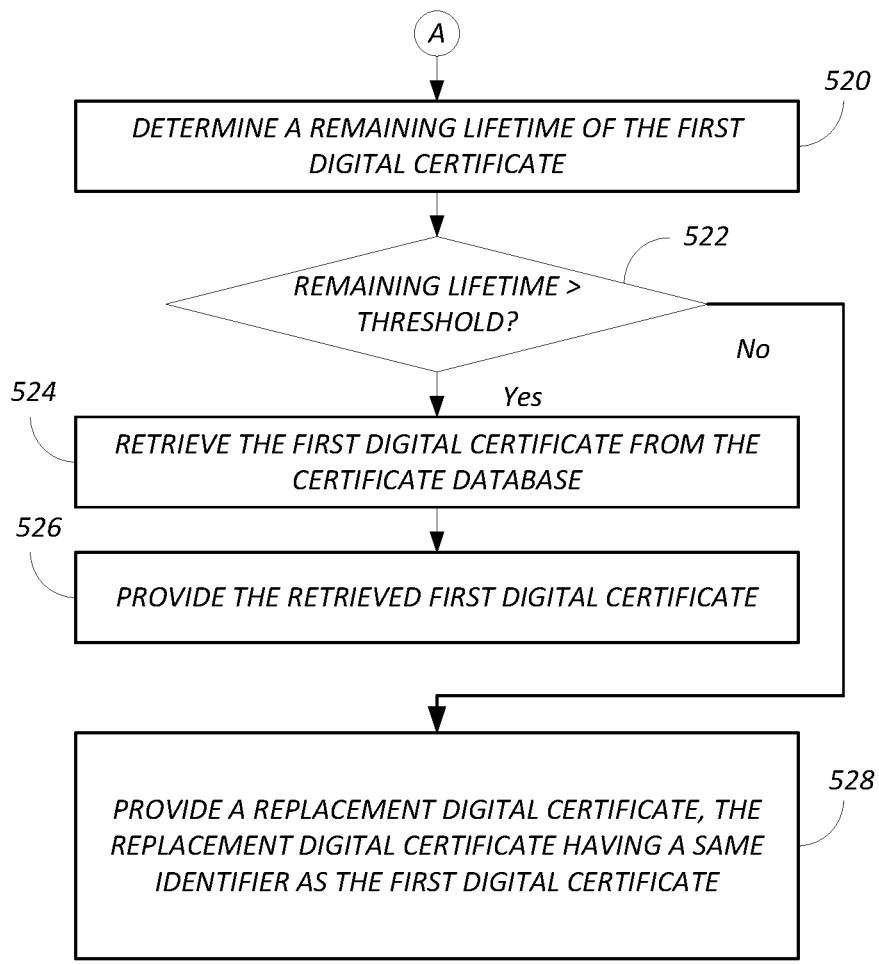

Referring now to FIG. 5A, the provisioning server 106 receives a request for a replacement digital certificate 156R having the same subject identity, as shown in block 502. This request may be received, for example, from a client device 108 or from an entity acting on behalf of the client device 108. As described below, this request may be triggered by the client device 108 when it is initially deployed as a part of installation procedure, triggered by a failure of the client device 108 in which the digital certificate is lost (for example, by a loss of memory in which the digital certificate is stored) or in response to revocation of an existing digital certificate 156 that was previously issued.

The provisioning server 106 checks to determine if a certificate has already been issued, and if no certificate has been issued to the client device 108, the provisioning server 106 simply issues a new digital certificate 156, and sends the new digital certificate 156 back to the client device 108. If the requested certificate has already been issued, the provisioning server 106 determines if the digital certificate has been revoked, as shown in block 504.

This is accomplished by the provisioning server 106 checking the CRL available at the distribution point 308A, or by transmitting a query having an identifier of the subject digital certificate 156 to the access point 308B. If the CRL or the response from the distribution point 308A or the access point 308B indicates that previously issued digital certificate 156 has not been revoked, block 506 routes processing to block 520 of FIG. 5B, which determines if the remaining lifetime of the non-revoked digital certificate. Block 522 then compares the remaining lifetime of the non-revoked digital certificate to an (optionally configurable) threshold, and if the remaining lifetime is greater than the threshold, in block 524 retrieves the same digital certificate from the certificate database 312 and in block 526 provides the retrieved digital certificate to the client device 108. If the remaining lifetime is not greater than the threshold, in block 528, the provisioning server 106 issues a new replacement digital certificate 156R with exactly the same identifier as the first digital certificate 156 and sends it to the requesting device 108 with no further action. In one embodiment, the threshold value is configurable by the administrator 318 using the CCA interface 316.

The replacement digital certificate 156R has the same identifier (subject ID) as the first (initially provided) digital certificate 156. In one embodiment, the replacement digital certificate 156R has a replacement public key of a replacement public/private key pair selected by the provisioning server 106. In another embodiment, the replacement digital certificate 156R has both the same identifier as the first digital certificate, and also the same public key.

If the initially provisioned digital certificate had been issued and the provisioning server 106 has determined that the initially provisioned digital certificate 156 has been revoked, processing is routed to block 508, in which the provisioning server 106 checks to determine if a replacement digital certificate 156 has been authorized by the administrator 318. In one embodiment, this is determined by retrieving a data structure that indicates whether the administrator 318 has approved the replacement digital certificate. The data structure may comprise a file comprising an identifier of the first digital certificate 156 and an approval status of the replacement digital certificate 156R, such as the list of approved replacement digital certificates (CRpL) pulled from the distribution point 308A. In this embodiment, the data structure is signed by the first certificate authority so the authenticity of the list can be ascertained. In another embodiment, the provisioning server 106 determines whether the replacement digital certificate 156R has been approved by receiving an indication, for example, in a signed response to a request transmitted from the access point 308B.

If the administrator 318 has not approved the replacement digital certificate 156R, block 510 routes processing to block 512, which returns an authorization error to the client device 108 indicating that the replacement digital certificate 156R is not authorized, and that the request has been denied. If a replacement digital certificate 156R is authorized by the administrator 318, processing is routed to block 514, in which the first certificate authority issues a replacement digital certificate 156R having the same subject identity as the first (initially provisioned) digital certificate 156. The replacement digital certificate 156R comprises a newly generated replacement public key of a new public/private key pair and is signed by the same issuing CA private key 162 that signed the first digital certificate 156. The provisioning server 106 then sends the replacement digital certificate 156R to the requesting client device 108.

In one embodiment, the request for the replacement digital certificate 156R is provided by the client device 108, and the replacement public/private key pair used to generate that replacement digital certificate 156R is generated by the client device 108, and replacement public key is included in the request for the replacement digital certificate 156R. The provisioning server 106 generates the replacement digital certificate 156R (which includes the replacement public key) and transmits the replacement digital certificate 156R to the client device 108.

In another embodiment, the request for the replacement digital certificate 156R is also provided by the client device 108, but the field provisioning server 106A generates the replacement key pair (including the replacement private key 150R and replacement public key) on behalf of the client device 108. In this embodiment, the provisioning server 106 generates a replacement digital certificate 156R that includes the replacement public key. Since the associated replacement private key 150R must be provided to the client device 108, the provisioning server 106 encrypts the replacement private key 150R according to a shared secret or other secure information and transmits the replacement private key 150R to the client device 108, where it can be decrypted and securely stored. In an alternative embodiment, replacement key pairs are encrypted origin private keys and corresponding origin certificates generated by the OFFCA 104 and forwarded to the provisioning server 106. The provisioning server 106 selects the next unused origin certificate 152 and encrypted private key 150R from its database and signs a new replacement certificate 156R based on the selected origin certificate 152 as described in U.S. Pat. No. 10,958,433. The replacement private key 150R is already stored in encrypted form on the provisioning server 106.

Optionally, the replacement digital certificate 156R may include additional attributes that were not present in the originally provided digital certificate 156 for the client device 108 or classes of client devices 108 which add restrictions on usage of the replacement digital certificate 156R. These restrictions may be desirable due to a decreased level of trust in this client device 108 since it previously suffered a private key 150 compromise.

Such restrictions may include, for example, identifiers of the complete set of external entities (e.g., HTTP server, possibly a specific secure HTTP server (HTTPS) such as Apache, a specific virtual private network (VPN) Gateway, etc.), or security protocols with which the replacement certificate is permitted to be used. The replacement digital certificate 156R may also include a list of a subset of applications for which use of the replacement digital certificate 156R is not permitted the client device 108 (or alternatively, a list of applications for which use of the certificate is authorized, and an indication that no other applications are authorized). The replacement digital certificate 156R may also be configured limit its use to a number of times per temporal interval. The lists of permitted and disallowed applications may be included, for example, in an X.509 certificate extension.

Another option is to add an attribute to the replacement digital certificate 156R which includes a count of how many private key 150 compromises (and subsequent digital certificate revocations) were previously suffered by this client device 108. This attribute may be included in a form of an X.509 certificate extension or a subject name attribute.

When the client device 108 possessing this replacement digital certificate 156R attempts to authenticate to another entity which we call a Relying Party, that Relying Party reviews these additional certificate attributes and determines, based on its security policy and the value of the attributes, if the Relying Party is willing to trust this client device 108 and establish a secure communication channel-given the restrictions on its certificate usage and given the number of times that this client has suffered a compromise of the private key 150. Some Relying Parties may have a policy limiting such access, while other Relying Parties may have no such limiting policies and accept the certificate regardless of the number of private key 150 compromises or subsequent revocation and renewal or replacement requests. For example, the Relying Party may reject the establishment of a secure communications channel with clients 108 that have suffered two or more private key 150 compromises.

Management of Intermediate Certificates Issued by a Sub CA

Figure 6:
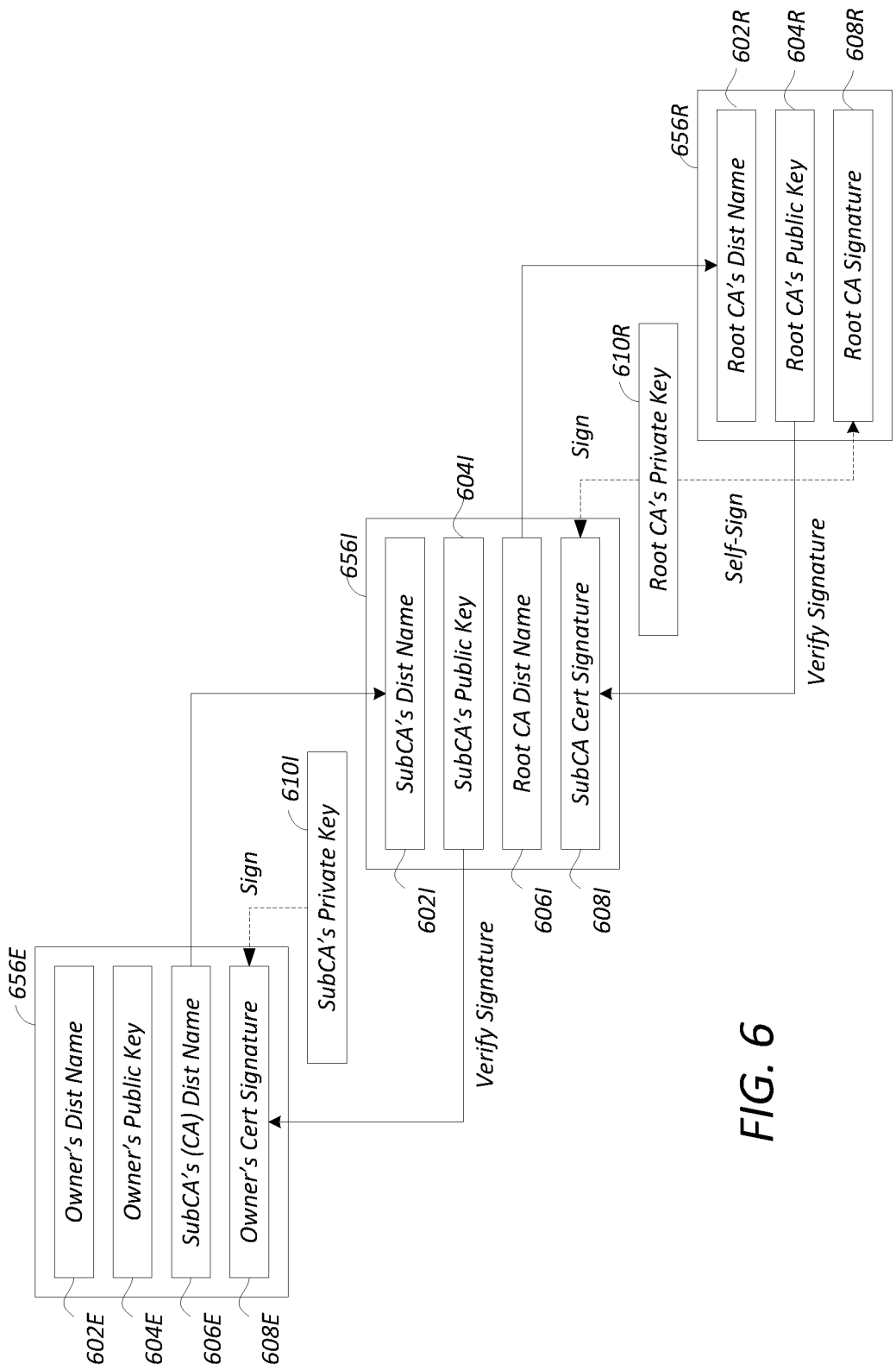
FIG. 6 is a diagram illustrating a series of digital certificates in a chain of trust.

The foregoing techniques of managing digital certificates are also applicable to the management of certificate chains including one or more digital certificates. For example, FIG. 6 is a diagram illustrating a series of digital certificates in a chain of trust. The certificates include a root certificate 656R issued by a root CA, an intermediate certificate 656I issued by a sub-CA, and an end-user (device) certificate 656E. The digital certificate chain of trust starts with a self-signed root certificate. 656R that includes the root CA's distinguished name 602R, the root CA's public key 604R, the root CA's signature 608R, created using the root CA's Private Key 610R.

A self-signed certificate is a certificate with a subject that matches its issuer, and a signature that can be verified by its own public key. The digital certificate chain of trust starts with this self-signed certificate, called a "root certificate," "trust anchor," or "trust root." A root CA self-signs a root certificate to be able to sign other certificates.

The intermediate certificate 656I is issued by the root CA and includes the sub CA's distinguished name 602I, the sub CA's public key 604I, the root CA's distinguished name 606I (which references the distinguished name 602R of the root certificate 656R, and the Sub CA certificate signature 608I (generated with the same root CA private key that is also used to sign the root certificate 608R). The root CA's public key 604R is used to verify the Sub CA certificate signature 608I of the intermediate certificate 656I.

The intermediate certificate 656I has a similar purpose to the root certificate 656R in that it is used to sign downstream certificates. However, an intermediate certificate 656R is not self-signed, but rather signed by the root CA's private key (or another intermediate CA's private key that corresponds to a digital certificate which ultimately chains to the root certificate).

The end entity or owner (device) certificate 656E includes the owner's distinguished name 602E, the owner's public key 604E (associated with the owner's private key), the sub CA's distinguished name 606E which references the sub CA's distinguished name in the intermediate certificate 656I, and the owner certificate signature 608E, which is created with the sub CA's private key 610I and can be verified using the sub CA's public key 604I. The end entity certificate 656 is not used to issue other certificates.

The CCA 306 can also revoke intermediate level certificates such as sub CA certificate 656I. This might be desirable if the sub-CA is compromised or if all of the device digital certificates 156 under that sub CA are compromised. This may happen, for example, if all of the devices 108 of a specific client device 108 model have a fatal security design flaw that allows the private key 150 to be extracted. In this case, sub CA certificate revocations can be listed in a CRL signed by the root CA. Once a sub CA certificate 156I has been revoked, all device certificates 156E previously issued by that sub CA are invalid, and therefore revoked as well.

Corresponding to revoked sub-CA certificate, the list of approved rekeys (e.g. the list of previously issued digital certificates for which a replacement digital certificate 156R has been authorized by the administrator 318) may include an identity of a Sub-CA which is allowed to provide the replacement certificate. Once a sub-CA is on an approved rekey list, all devices under that sub-CA operating with an approved replacement sub-CA certificate are allowed to receive new certificates and new public keys. Alternatively, the sub-CA may be replaced with a new sub-CA with a new identity (including new sub-CA Distinguished Name 602I and new sub-CA Public Key 604I) such that new replacement certificates 156R are issued under the new sub-CA.

Further, in certificate chain embodiments, the revocation and replacement status of the digital certificates must be checked for the entire certificate chain above the root certificate 656R (e.g. the digital certificate at issue, and the digital certificate of each sub-CA in the certificate chain).

Exemplary Use Case

For exemplary purposes, a possible sequence of events corresponding to a specific client device 108 digital certificate is presented below.

A first digital certificate is generated by the first certificate authority. The first digital certificate includes a public key of a private/public key pair and is signed by the private key belonging to the first certificate authority. A first digital certificate 156 is issued to the client device 108 by a factory provisioning server 106B and installed in the client device 108. Alternatively, the first digital certificate 156 may have been issued by the field provisioning server 106A to a client device 108 that is already deployed (e.g. installed in the customer's home). The client device 108 uses that digital certificate 156 in communication with other identifies to allow the identity of the client device 108 to be authenticated. The digital certificate 156 is provided to a central certificate database 304 accessible to the CCA 306, where it is stored. The CCA 306 also has a copy of the certificate issuing key 162 of the first certificate authority that it utilizes to sign CRLs. Alternatively, the access point 308B has a copy of that same certificate issuing key 162 and utilizes it to sign responses to the queries of each certificate's status.

Sometime later, the client device 108 is hacked and the private key 150 is compromised or suspected to have been compromised. This potential compromise of the private key 150 is reported to the CCA 306 (for example, by network operator's authorized revocation client 307 or a third party such as the manufacturer of the client devices 108 or an entity using the client devices 108. Using the interface presented by a computer or similar device 316, the administrator 318 accesses the database 304 and other information and determines that the first digital certificate 156 should be revoked. The administrator 318 commands the CCA 306 to revoke the first digital certificate 156. This can be accomplished by providing information regarding the revocation status of the digital certificate 156 for retrieval. This information may comprise a CRL having an identifier of the digital certificate 156 to be revoked provided to distribution point 308A and/or an identifier of the digital certificate 156 to be revoked being provided to the access point 308B.

Sometime later, the same client device 108 is updated with new software that enables additional security features making the previous attack impractical. If a global digital certificate and private key are necessary to authenticate a request from the client device 108 to the provisioning server 106 to obtain a replacement digital certificate 156R, that global certificate and private key may be provided to the client device 108 along with the software update.

The CCA 306 is then informed that the security breaches of the client device 108 have been ameliorated. This information may include any information useful to the administrator 318 to determine whether to approve the remediation and approve the generation and issuance of a replacement digital certificate 156R. If the administrator 318 approves the generation and issuance of the replacement digital certificate 156R, the administrator 318 instructs the CCA 306 to provide information regarding such replacement digital certificate 156R approval for retrieval by the first certificate authority.

The same client device 108 already installed in the customer's location requests a replacement digital certificate 156R. This request is submitted to the field provisioning server 106A. In one embodiment, the request comes directly from the client device 108, but the request may instead come from the manufacturer of the client devices 108, or another approved entity. For example, if a class of client devices 108 have been compromised, the manufacturer may upload the updated software, then submit a request for new credentials in the affected client devices' 108 behalf, rather than have each such client device 108 make the request. As the first device certificate 156 has been revoked, if the client device 108 itself is making the request, the request may be authorized by using the global certificate provided with the software update (and optionally protected by being obfuscated). Alternatively, the client device 108 may have been provisioned with multiple digital certificates and only one of the digital certificates has been revoked. For example, a client device 108 may have a certificate and private key protected purely in software that was compromised and revoked and another hardware-protected certificate & private key that can still be trusted. In this case, a client device 108 may authenticate its request with its second non-revoked certificate.

The field provisioning server 106A reads the CRL from the distribution point 308A or queries the access point 308B to determine whether the first digital certificate was revoked, and if so, reads the certificate replacement list to determine whether a replacement digital certificate 156R has been authorized. If so, replacement digital certificate 156R is generated using a new public/private key pair, and the replacement digital certificate 156R having the new public key (and the private key) are transmitted to the client device 108.

Hardware Environment

Figure 7:
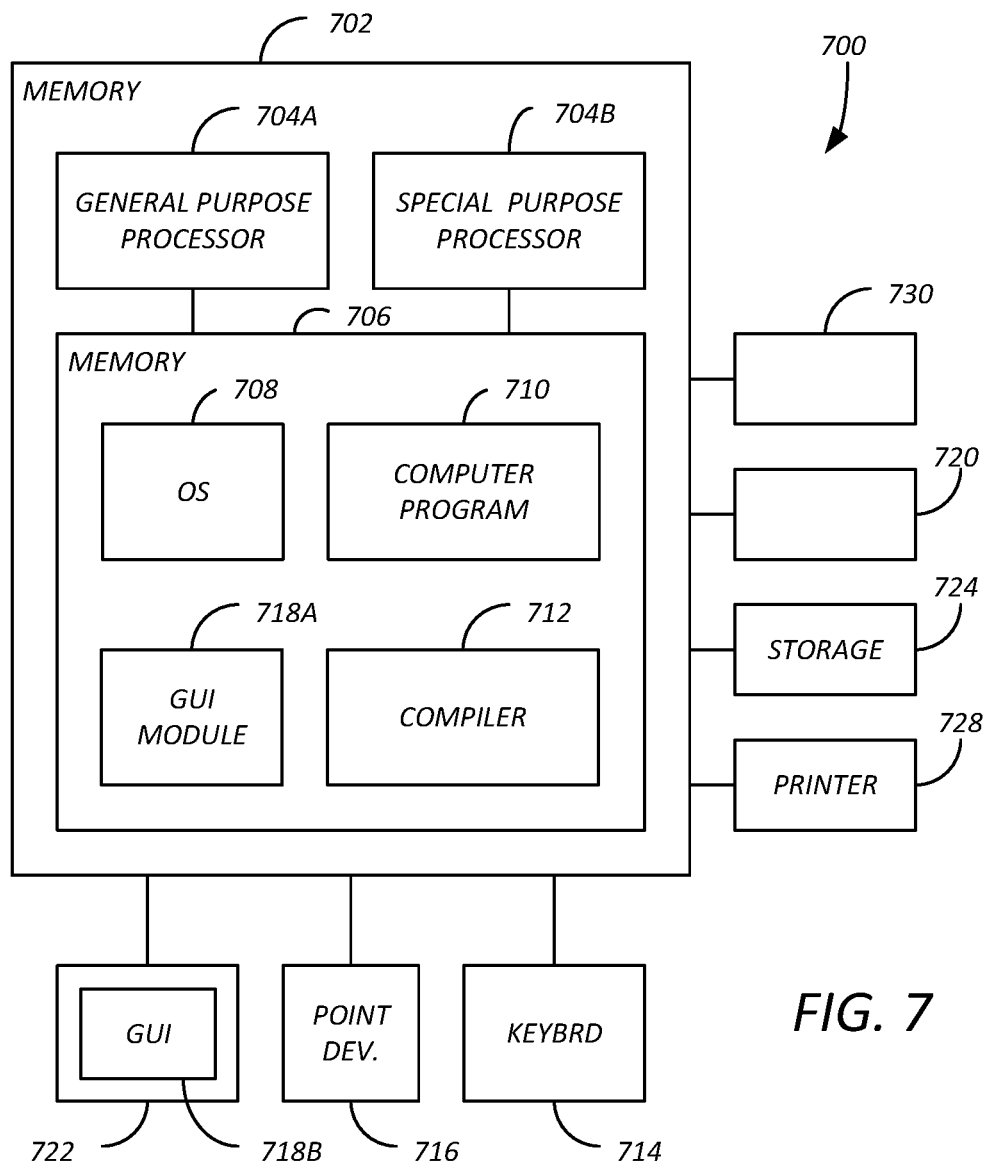
FIG. 7 illustrates an exemplary computer system that could be used to implement processing elements or the certificate management system.

FIG. 7 illustrates an exemplary computer system 700 that could be used to implement processing elements of the above disclosure, including the CCA 306, client devices 108, provisioning servers 106, databases 304 and 312, notification entity 308, and certificate aggregator 302. The computer 702 comprises a processor 704 and a memory, such as random access memory (RAM) 706. The computer 702 is operatively coupled to a display 722, which presents images such as windows to the user on a graphical user interface 718B. The computer 702 may be coupled to other devices, such as a keyboard 714, a mouse device 716, a printer 728, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI) module 718A. Although the GUI module 718B is depicted as a separate module, the instructions performing the GUI functions can be resident or distributed in the operating system 708, the computer program 710, or implemented with special purpose memory and processors. The computer 702 also implements a compiler 712 which allows an application program 710 written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 708, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the operations herein described. Computer program 710 and/or operating instructions may also be tangibly embodied in memory 706 and/or data communications devices 730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing discloses a method of managing a digital certificate stored by a client device. The method includes receiving a first digital certificate issued by a first certificate authority having a provisioning server; storing the received first digital certificate in a certificate database accessible to a second certificate authority; receiving, in the second certificate authority, a request to perform a revocation on the first digital certificate; retrieving the stored first digital certificate; receiving a first command from an administrator to approve the requested first digital certificate revocation; providing information regarding a revocation status of the first digital certificate for retrieval by the first certificate authority; receiving in the second certificate authority, a request to generate a replacement digital certificate having a same subject identity as the first digital certificate and a new public key; receiving a second command from the administrator to approve a generation of the requested replacement digital certificate; and providing information regarding a status of the requested first digital certificate replacement for retrieval by the first certificate authority.

Implementations may include one or more of the following features.

The above method wherein the information regarding revocation status is signed by the second certificate authority using a same signing key used by the first certificate authority to sign the first digital certificate.

Any of the above methods wherein: the information regarding the revocation status of the digital certificate for retrieval by the first certificate authority is provided to at least one of: a distribution point; and an access point.

Any of the above methods wherein: the first certificate authority delegates the provision of the information regarding the revocation status of the digital certificate to the second certificate authority; and the information regarding revocation status is signed by the second certificate authority according to a different signing key used by the first certificate authority to sign the first digital certificate.

Any of the above methods wherein: the first digital certificate includes a field identifying the second certificate authority as being delegated to provide the information regarding revocation status.

Any of the above methods wherein: the first certificate authority issues a signing certificate to the second certificate authority delegating the second certificate authority to provide the information regarding revocation status.

Any of the above methods wherein: the information regarding a revocation status may include an identifier of the first digital certificate in a list of identifiers of revoked digital certificates provided to the distribution point; and confirming, by the provisioning server, that the first digital certificate is revoked may include: confirming that the identifier of the first digital certificate is included in the list of identifiers of revoked digital certificates.

Any of the above methods wherein: the provisioning server transmits a message to the access point may include an identifier of the first digital certificate; and the method further may include: receiving, by the provisioning server, an indication that the first digital certificate identified by the identifier is revoked from the access point.

Any of the above methods wherein: the method further includes: receiving, by the provisioning server, a request for the replacement digital certificate for the same subject identity as the first digital certificate following revocation; and determining, by the provisioning server, that the first digital certificate is revoked; and if the first digital certificate is revoked, determining if the administrator approved the replacement digital certificate; if the administrator did not approve the replacement digital certificate, returning an authorization error; and if the administrator approved the replacement digital certificate, issuing, by the first certificate authority, the replacement digital certificate having the same subject identity as the first digital certificate.

Any of the above methods wherein: determining if the administrator approved the replacement digital certificate may include: retrieving a data structure signed by the first certificate authority, the data structure indicating if the administrator approved the replacement digital certificate, where the data structure may include an identifier of the first digital certificate and an approval status of the replacement digital certificate; and determining, from the data structure, if the administrator approved the replacement digital certificate.

Any of the above methods wherein: determining if the administrator approved the replacement digital certificate may include: receiving, in the provisioning server, an indication that the administrator approved the replacement digital certificate, the indication signed by the first certificate authority.

Any of the above methods wherein: the received indication is in response to a request transmitted from the provisioning server to the first certificate authority.

Any of the above methods wherein: the method further includes: if the first digital certificate is not revoked, determining a remaining lifetime of the first digital certificate; if the remaining lifetime of the digital certificate exceeds a configurable threshold; retrieving the first digital certificate from the certificate database; providing the retrieved first digital certificate; and if the remaining lifetime of the digital certificate does not exceed a configurable threshold: providing a replacement digital certificate, the replacement digital certificate having a same identifier as the first digital certificate and a replacement public key of a replacement public/private key pair generated by the provisioning server.

Any of the above methods wherein: the replacement digital certificate may include an attribute identifying a restriction in use of the replacement digital certificate.

Any of the above methods wherein: the restriction is selected from a group including: restricting use of the replacement digital certificate to a subset of applications and security protocols; and restricting the use of the replacement digital certificate to a limited number per time period.

Any of the above methods wherein: the replacement digital certificate may include a further attribute indicating how many times digital certificates for a specified client identity have been revoked.

Any of the above methods wherein: the request for the replacement digital certificate is provided by the client device; the client device generates a replacement key pair for the replacement digital certificate, the replacement key pair may include a replacement private key and a replacement public key; and the request for the replacement digital certificate includes the replacement public key; and the replacement digital certificate includes the replacement public key.

Any of the above methods wherein: the request for the replacement digital certificate is provided by the client device and the provisioning server generates the a replacement key pair on behalf of the client device, the replacement key pair including a replacement private key and a replacement public key; the replacement digital certificate is generated according to the replacement public key and includes the replacement public key; and the method further includes: generating the replacement digital certificate according to the replacement public key; encrypting the replacement private key; and providing the encrypted replacement private key together with the replacement digital certificate as a pair to the client device. Implementations of the described techniques may include hardware, a method or process, or computer software on a computer-accessible medium.

Another embodiment is evidenced by an apparatus having a processor and a communicatively coupled memory storing processor instructions for performing the operation of the foregoing methods.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of managing a digital certificate stored by a client device, comprising:
    receiving a first digital certificate issued by a first certificate authority having a provisioning server;
    storing the received first digital certificate in a certificate database accessible to a second certificate authority;
    receiving, in the second certificate authority, a request to perform a revocation on the first digital certificate;
    retrieving the stored first digital certificate;
    receiving a first command from an administrator to approve the requested revocation of the first digital certificate;
    providing information regarding a revocation status of the first digital certificate for retrieval by the first certificate authority;
    receiving in the second certificate authority, a request to generate a replacement digital certificate having a same subject identity as the first digital certificate and a new public key;
    receiving a second command from the administrator to approve a generation of the requested replacement digital certificate;
    providing information regarding a status of the requested replacement digital certificate for retrieval by the first certificate authority;
    receiving, by the provisioning server, a request for the replacement digital certificate for the same subject identity as the first digital certificate following revocation;
    determining, by the provisioning server, that the first digital certificate is revoked; and
    if the first digital certificate is revoked, determining if the administrator approved the replacement digital certificate;

if the administrator did not approve the replacement digital certificate, returning an authorization error; and if the administrator approved the replacement digital certificate, issuing, by the first certificate authority, the replacement digital certificate having the same subject identity as the first digital certificate.

2. The method of claim 1, wherein the information regarding revocation status is signed by the second certificate authority using a same signing key used by the first certificate authority to sign the first digital certificate.

3. The method of claim 1, wherein the information regarding the revocation status of the digital certificate for retrieval by the first certificate authority is provided to at least one of a distribution point and an access point.

4. The method of claim 3, wherein:
the first certificate authority delegates the provision of the information regarding the revocation status of the digital certificate to the second certificate authority; and
the information regarding revocation status is signed by the second certificate authority according to a different signing key used by the first certificate authority to sign the first digital certificate.

5. The method of claim 4, wherein the first digital certificate includes a field identifying the second certificate authority as being delegated to provide the information regarding revocation status.

6. The method of claim 4, wherein the first certificate authority issues a signing certificate to the second certificate authority delegating the second certificate authority to provide the information regarding revocation status.

7. The method of claim 3, wherein the information regarding a revocation status comprises an identifier of the first digital certificate in a list of identifiers of revoked digital certificates provided to the distribution point and confirming, by the provisioning server, that the first digital certificate is revoked by confirming that the identifier of the first digital certificate is included in the list of identifiers of revoked digital certificates.

8. The method of claim 3, wherein:
the provisioning server transmits a message to the access point comprising an identifier of the first digital certificate; and
the method further comprises receiving, by the provisioning server, an indication that the first digital certificate identified by the identifier is revoked from the access point.

9. The method of claim 1, wherein:
determining if the administrator approved the replacement digital certificate comprises:
retrieving a data structure signed by the first certificate authority, the data structure indicating if the administrator approved the replacement digital certificate, wherein the data structure comprises an identifier of the first digital certificate and an approval status of the replacement digital certificate; and
determining, from the data structure, if the administrator approved the replacement digital certificate.

10. The method of claim 1, wherein determining if the administrator approved the replacement digital certificate comprises receiving, in the provisioning server, an indication that the administrator approved the replacement digital certificate, the indication signed by the first certificate authority.

11. The method of claim 10, wherein the received indication is in response to a request transmitted from the provisioning server to the first certificate authority.

12. The method of claim 1, further comprising:
if the first digital certificate is not revoked, determining a remaining lifetime of the first digital certificate;
if the remaining lifetime of the digital certificate exceeds a configurable threshold;
retrieving the first digital certificate from the certificate database;
providing the retrieved first digital certificate; and
if the remaining lifetime of the digital certificate does not exceed a configurable threshold:
providing a replacement digital certificate, the replacement digital certificate having a same identifier as the first digital certificate and a replacement public key of a replacement public/private key pair generated by the provisioning server.

13. The method of claim 12, wherein the replacement digital certificate comprises an attribute identifying a restriction in use of the replacement digital certificate.

14. The method of claim 13, wherein the restriction is selected from a group comprising:
restricting use of the replacement digital certificate to a subset of applications and security protocols; and
restricting the use of the replacement digital certificate to a limited number per time period.

15. The method of claim 12, wherein the replacement digital certificate comprises a further attribute indicating how many times digital certificates for a specified client identity have been revoked.

16. The method of claim 1, wherein:
the request for the replacement digital certificate is provided by the client device;
the client device generates a replacement key pair for the replacement digital certificate, the replacement key pair comprising a replacement private key and a replacement public key; and
the request for the replacement digital certificate includes the replacement public key; and
the replacement digital certificate includes the replacement public key.

17. The method of claim 1, wherein:
the request for the replacement digital certificate is provided by the client device and the provisioning server generates the a replacement key pair on behalf of the client device, the replacement key pair including a replacement private key and a replacement public key;
the replacement digital certificate is generated according to the replacement public key and includes the replacement public key; and
the method further comprises:
generating the replacement digital certificate according to the replacement public key;
encrypting the replacement private key; and
providing the encrypted replacement private key together with the replacement digital certificate as a pair to the client device.

18. An apparatus for managing a digital certificate stored by a client device, comprising:
a processor; and
a memory, communicatively coupled to the processor, the memory storing processor instructions comprising processor instructions for:
receiving a first digital certificate issued by a first certificate authority having a provisioning server;
storing the received first digital certificate in a certificate database accessible to a second certificate authority;

receiving, in the second certificate authority, a request to perform a revocation on the first digital certificate,
retrieving the stored first digital certificate;
receiving a first command from an administrator to approve the requested revocation of the first digital certificate;
providing information regarding a revocation status of the first digital certificate for retrieval by the first certificate authority;
receiving in the second certificate authority, a request to generate a replacement digital certificate having a same subject identity as the first digital certificate and a new public key;
receiving a second command from the administrator to approve a generation of the requested replacement digital certificate; and
providing information regarding a status of the requested digital certificate for retrieval by the first certificate authority;
receiving, by the provisioning server, a request for the replacement digital certificate for the same subject identity as the first digital certificate following revocation;
determining, by the provisioning server, that the first digital certificate is revoked; and
if the first digital certificate is revoked, determining if the administrator approved the replacement digital certificate;
if the administrator did not approve the replacement digital certificate, returning an authorization error; and
if the administrator approved the replacement digital certificate, issuing, by the first certificate authority, the replacement digital certificate having the same subject identity as the first digital certificate.

\* \* \* \* \*